US010565637B2

(12) United States Patent
Westphal et al.

(10) Patent No.: US 10,565,637 B2
(45) Date of Patent: Feb. 18, 2020

(54) SYSTEM AND METHOD FOR DIRECTING A CUSTOMER TO ADDITIONAL PURCHASING OPPORTUNITIES

(75) Inventors: Geoffry A. Westphal, Park Ridge, IL (US); Thomas John Carroll, Algonquin, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 1746 days.

(21) Appl. No.: 12/850,149

(22) Filed: Aug. 4, 2010

(65) Prior Publication Data

US 2010/0299204 A1 Nov. 25, 2010

Related U.S. Application Data

(60) Division of application No. 11/244,965, filed on Oct. 6, 2005, now abandoned, which is a continuation-in-part of application No. 11/089,380, filed on Mar. 24, 2005, now Pat. No. 7,343,326, which is a division of application No. 10/452,868, filed on Jun. 2, 2003, now Pat. No. 7,313,536.

(51) Int. Cl.
*G06Q 30/00* (2012.01)
*G06Q 30/06* (2012.01)

(52) U.S. Cl.
CPC ................ *G06Q 30/0631* (2013.01)

(58) Field of Classification Search
CPC ............... G06Q 30/02; G06Q 30/0251; G06Q 30/0623; G06Q 30/0625; G06Q 30/0631
See application file for complete search history.

(56) References Cited

U.S. PATENT DOCUMENTS

| 6,032,145 | A  | * | 2/2000  | Beall ................. G06Q 30/0633 705/26.8 |
| 6,412,012 | B1 | * | 6/2002  | Bieganski et al. ............ 709/232 |
| 6,631,365 | B1 | * | 10/2003 | Neal ..................... G06F 16/313 707/690 |
| 7,254,582 | B2 | * | 8/2007  | Song et al. .................. 705/26.1 |
| 7,437,344 | B2 | * | 10/2008 | Peyrelevade .................. 706/62 |
| 2004/0230494 | A1 | * | 11/2004 | Lotvin .................. G06Q 20/02 705/26.4 |

OTHER PUBLICATIONS

Gerald L. Lohse et al. "Electronic Shopping", Communications of the ACM, Jul. 1998 / vol. 41, No. 7, pp. 81-88. (Year: 1998).*
Greg Linden et al. "Amazon.com Recommendations Item-to-Item Collaborative Filtering", IEEE Internet Computing, Jan./Feb. 2003, pp. 76-80. (Year: 2003).*
United States Patent and Trademark Office, Office Action cited in U.S. Appl. No. 13/681,042, dated Jun. 25, 2013, 12 pages.

* cited by examiner

*Primary Examiner* — Naeem U Haq
(74) *Attorney, Agent, or Firm* — Greenberg Traurig, LLP

(57) ABSTRACT

A dynamic merchandising system creates for each of a plurality of products in a plurality of purchase orders a list of products purchased together. This information is then used to create ordered lists reflecting relationships between various product attributes, e.g., the relationships between different brand names purchased together, different product categories purchased together, different catalog pages of products purchased together, etc. From these ordered relationship lists information may be selected and presented to the customer for the purpose of directing the customer to additional purchasing opportunities.

4 Claims, 14 Drawing Sheets

Purchase Order Collection

| Purchase Order Number Field | Product Reference Number |
|---|---|
| 3429993 | 1F018 |
| 3306540 | 3U552 |
| 3306540 | 6VR65 |
| 3526000 | 5T943 |
| 3605011 | 2A225 |
| 3244073 | 2V620 |
| 3197461 | 4RJ34 |
| 3227811 | 3U552 |
| 3227811 | 4RJ34 |
| 3227811 | 4L582 |
| 3227811 | 4L581 |
| 3298553 | 4RJ34 |
| 3298553 | 3U552 |
| ... | ... |

FIG. 1

Purchased-With Data Structure

| Product Reference Number | Purchased-With String of Product Reference Numbers |
|---|---|
| | |

FIG. 2

Purchased-With Data Structure with Unique Product Reference Numbers Populated

| Product Reference Number | Purchased-With String of Product Reference Numbers |
|---|---|
| 1F018 | |
| 2A225 | |
| 2V620 | |
| 3U552 | |
| 4L581 | |
| 4L582 | |
| 4RJ34 | |
| 5T943 | |
| 6VR65 | |

Purchased-With Data Structure with Purchased-With String Populated BEFORE processing PO 3298553

| Product Reference Number | Purchased-With String of Product Reference Numbers |
|---|---|
| 1F018 | |
| 2A225 | |
| 2V620 | |
| 3U552 | 6VR65 4RJ34 4L582 4L581 |
| 4L581 | 3U552 4RJ34 4L582 |
| 4L582 | 3U552 4RJ34 4L581 |
| 4RJ34 | 3U552 4L582 4L581 |
| 5T943 | |
| 6VR65 | 3U552 |
| ... | ... |

FIG. 5

Purchased-With Data Structure with Purchased-With String Populated AFTER processing PO 3298553

| Product Reference Number | Purchased-With String of Product Reference Numbers |
|---|---|
| 1F018 | |
| 2A225 | |
| 2V620 | |
| 3U552 | 4RJ34 6VR65 4L582 4L581 |
| 4L581 | 3U552 4RJ34 4L582 |
| 4L582 | 3U552 4RJ34 4L581 |
| 4RJ34 | 3U552 4L582 4L581 |
| 5T943 | |
| 6VR65 | 3U552 |
| ... | ... |

EXAMPLES OF PURCHASED-
WITH PRODUCT ATTRIBUTE
PAIRINGS

|  | Product Category | Product Brand Name | Product SKU | Vocation | Product SKU | Geography |
|---|---|---|---|---|---|---|
| Product Category | | | | | | |
| Product Brand Name | | | | | | |
| Catalog Page | | | | | | |
| Vocation | | | | | | |
| Product SKU | | | | | Current | |
| Geography | | | | | | |

SYSTEM AND METHOD FOR DIRECTING A CUSTOMER TO ADDITIONAL PURCHASING OPPORTUNITIES

RELATED APPLICATION DATA

This application claims the benefit of and is a divisional of U.S. application Ser. No. 11/244,965, filed on Oct. 6, 2005, which application is a continuation-in-part of U.S. application Ser. No. 11/089,380, filed on Mar. 24, 2005, which application is a divisional of U.S. application Ser. No. 10/452,868, filed on Jun. 2, 2003, the disclosures of which are incorporated herein by reference in their entirety.

BACKGROUND

This following generally relates to dynamic merchandising and, more particularly, relates to a system and method for directing a customer to additional purchasing opportunities.

There are an increasing number of business to customer ("B2C") websites that allow customers to purchase products online. In using these systems, and at various times during the purchasing process, the website may offer recommendations of other products that the customer may also be interested in purchasing. These recommendations can serve not only to increase sales, but also to drive awareness that the merchant carries a particular product or brand.

By way of example, U.S. Pat. No. 6,317,722 discloses a system for recommending products to customers based upon the collective interests of a community of customers. For providing recommendations, a similar product table is created, using an off-line process, that functions to map a known product to a set of products that are identified as being similar to the known product. In this regard, similarity is measured by a weighted score value that is indicative of the number of customers that have an interest in two products relative to the number of customers that have an interest in either product. The numbers utilized to establish similarity in this manner are typically derived by examining invoices to determine when the two products appear together and when one product appears exclusive of the other product. The weighting value may be indicative of user ratings provided to products and/or a time duration since a product pair was last purchased.

In addition, many of the B2C websites sell products that are demographically sensitive. That is, it is assumed that any given product may appeal to customers only if the customer falls within a certain demographic category. These demographic categories might include an age range, an income range, a particular sex or sexual orientation, a particular marital status, a particular political view, a particular health status, etc. Thus, certain websites attempt to deduce demographic categories for customers based upon prior purchase histories of that customer and/or expressed product preferences provided by that customer. One such website is described in U.S. Pat. No. 6,064,980 which provides product recommendations by correlating product ratings provided by a customer with product ratings provided by other customers within a purchasing community.

While these website product recommendation techniques may be useful in the B2C environment, what is needed is an improved system and method for providing product recommendations, especially in the business to business ("B2B") environment where products may have less customer-demographic sensitivity and where products do not have fads, trends, and/or fashions.

SUMMARY

To address this need, the following describes a system and method for recommending products which utilizes product relationships that are considered independently of customer demographics. The system and method generally creates for each of a plurality of products in a plurality of purchase orders a list of purchased-with products, i.e., products that were purchased with each of the plurality of products in each of the plurality of purchase orders. At the same time that the purchased-with product lists are created, or in another step, the same plurality of purchase orders are examined and, using the concept of "self organizing lists," the lists of purchased-with products are ordered in a meaningful manner. The ordering of the products in a purchased-with list may then be considered when recommending products. The subject system and method may also be used to help identify significant customer behaviors that warrant additional processing or attention.

Yet further, the dynamic merchandising system may create for each of a plurality of products in a plurality of purchase orders a list of products purchased together. This information may then be used to create ordered lists reflecting relationships between various attributes of the products, e.g., the relationships between different brand names purchased together, different product categories purchased together, different catalog pages of products purchased together, etc. From these ordered relationship lists information may be selected and presented to the customer for the purpose of directing the customer to additional purchasing opportunities.

A better understanding of the objects, advantages, features, properties and relationships of the system and method for providing product recommendations will be obtained from the following detailed description and accompanying drawing that set forth illustrative embodiments that are indicative of the various ways in which the principles expressed hereinafter may be employed.

BRIEF DESCRIPTION OF THE DRAWINGS

For a better understanding of the system and method for directing a customer to additional purchasing opportunities, reference may be had to preferred embodiments shown in the following drawings in which:

FIG. 1 illustrates an exemplary first data structure used to store data representative of information contained within a collection of purchase orders;

FIGS. 2-5 illustrate an exemplary second data structure used to order the data stored in the first data structure of FIG. 1;

FIG. 11 illustrates an exemplary Web page including brand name links for directing a customer to additional purchasing opportunities applicable to a specified brand name;

FIG. 16 illustrates exemplary purchased-with product attribute pairings available for use in directing a customer to additional purchasing opportunities;

DETAILED DESCRIPTION

Figure 6:
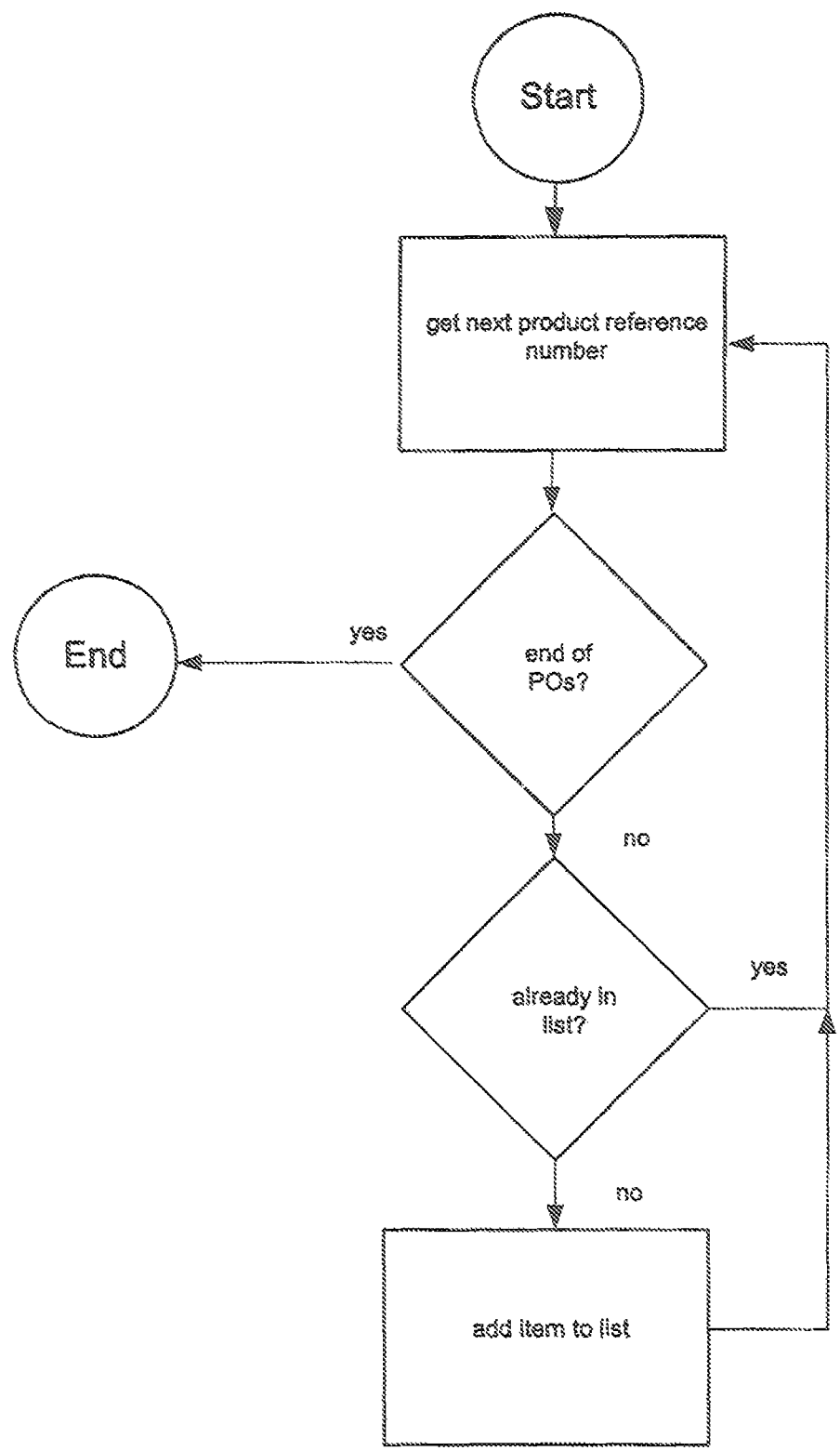
FIG. 6 illustrates a flow chart diagram of an exemplary method for populating the second data structure with data extracted from the first data structure.

With reference to the figures, a system and method for recommending products is hereinafter described. To this end, the system and method examines product relationships and utilizes a data structure in which information indicative of these product relationships is maintained, e.g., product category, product brand name, product keyword, product catalog page, and/or product SKU commonly purchased-with a consumer specified (directly or indirectly) product category, product brand name, product keyword, product catalog page, and/or product SKU. The product relationships reflected in the data structure may then be used to recommend products, either in a web-based system or, for example, to prepare product merchandizing literature.

To create a data structure useful in discerning product relationships, a collection of customer purchase orders is preferably assembled. This collection of purchase orders may be assembled from any source such as, but not limited to, purchase orders related to on-line purchases, phoned-in purchases, faxed-in purchases, and over-the-counter purchases. An assemblage of purchase order data stored in a first data structure is illustrated by way of example in FIG. 1. From this assemblage of purchase order data, product relationships may be determined by examining two data fields. The first data field 10 includes data 11 representative of a unique number assigned to each purchase order. The data 11 representative of the unique purchase order number allows the subject system and method to identify what products are contained in each purchase order. The second data field 12 includes data 13a representative of the reference numbers that have been assigned to products contained in each purchase order. The unique product reference numbers may be assigned by the vendor of the products, may be representative of a barcode label associated with the product, etc. Thus, in the example illustrated in FIG. 1, it can be discerned that a customer purchased products "3U552," "4RJ34," "4L582," and "4L581" in purchase order "3227811." It may also be seen in the exemplary assemblage of data illustrated in FIG. 1 that each unique product that is on every purchase order has a corresponding record which includes the first data field 10 (containing data 11 representative of the purchase order number) and the second data field 12 (containing data 13a representative of the product identifier for that product). It may be further seen that, when a product ("3U522") is repeated in the second data field 12, the data in the first data field 10 will be different, i.e., signifying that the same unique product was purchased in two different purchase orders. As further illustrated by the exemplary assemblage of data presented in FIG. 1, the assemblage of data need not track the number of times a given product was purchased in a given purchase order.

To populate a purchased-with data structure that may then be used to discern product relationships, the assemblage of purchase order data is further processed. In this regard, the assemblage of purchase order data is processed to populate two data fields in the purchased-with data structure. While not required, processing of the assemblage of purchase order data may be facilitated by sorting the assemblage of purchase order data by the purchase order number data field 10.

More particularly, as illustrated by way of example in FIGS. 2-4, the first data field 14 of the purchased-with data structure will include data 13b representative of a product reference number. The second data field 16 will include data 13c representative of products purchased-with the product referenced in the first data field 14—considering all of the purchase orders. The data 13c may be stored as a purchased-with string. When creating the purchased-with data structure, it will be appreciated that the second data field 16 is preferably large enough to hold data representative of all of the unique product references that could be purchased from the vendor with the product indicated in the first data field 14. Similarly, the purchased-with data structure preferably includes enough records for each uniquely identifiable product.

As particularly illustrated in FIG. 6, the purchased-with data structure may be populated by examining the assemblage of purchase order data to first discern the list of unique product references that occur within the purchase order collection. The unique product references that occur within the purchase order collection are then used to populate the first data field 14 of the purchased-with data structure. For this purpose, the data 13a representative of a product reference number in each record in the assemblage of purchase order data is examined to see whether that product reference number is reflected in the data 13b that already exists in a first data field 14 of the purchased-with data structure. If the product reference number 13b is already reflected in a first data field 14 of the purchased-with data structure, the record currently being examined may be skipped, i.e., a first data field 14 of the purchased-with data structure need not be populated with data representative of that product reference number. If, however, that product reference number is not reflected in a first data field 14 of the purchased-with data structure, a new record is added to the purchased-with data structure and the first data field 14 of that new record is populated with data 13b representative of that product reference number. This process may continue until all the records in the assemblage of purchase order data are examined in this way. In this manner, when this processing terminates, the purchased-with data structure will contain a single record for each unique product reference number that appears in the purchase order data assemblage as seen by way of example in FIG. 3. (Note that only one record appears that includes data 13b representative of product "3U552").

Figure 7:
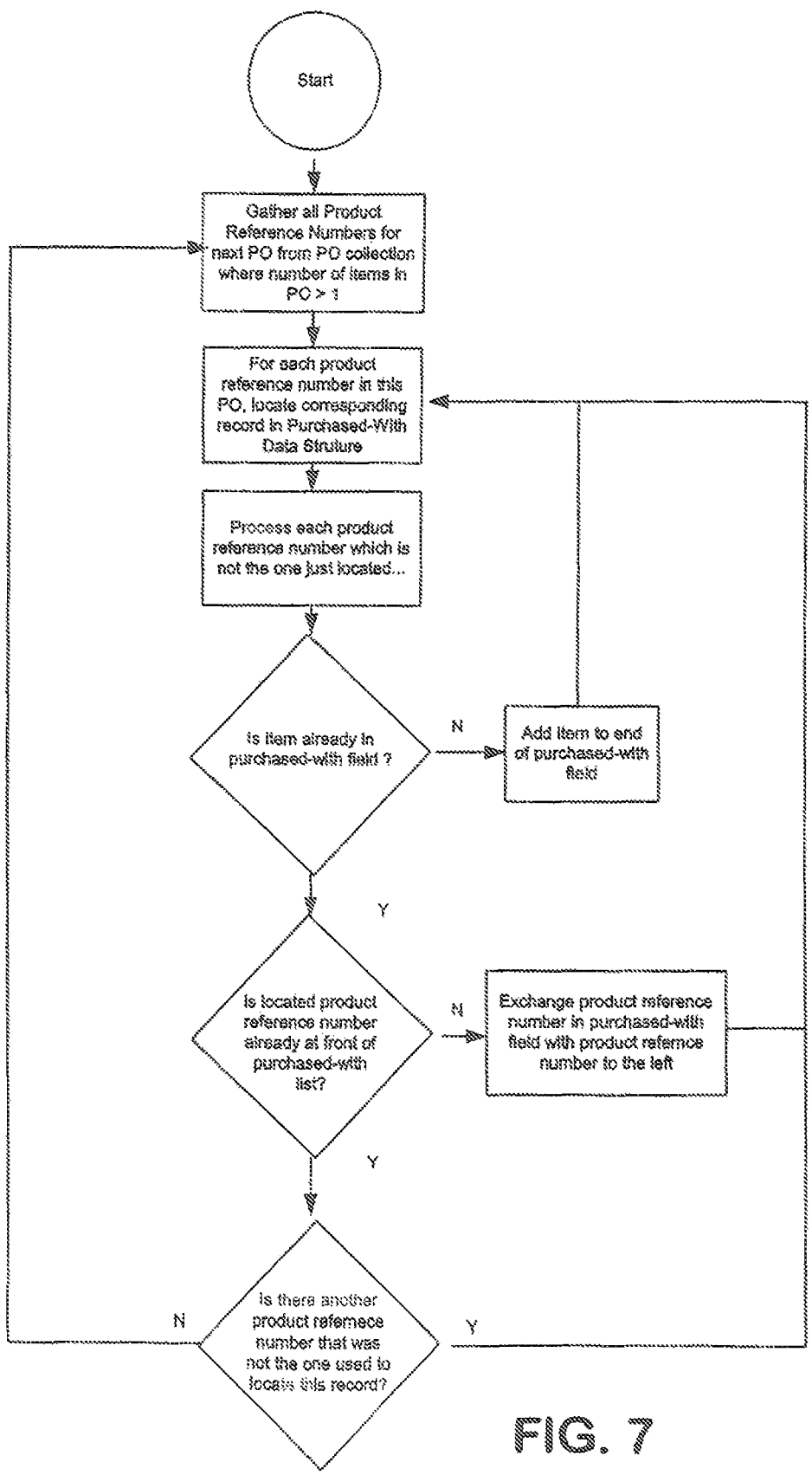
FIG. 7 illustrates a flow chart diagram of an exemplary method for populating and ordering the data within the second data structure.

To then populate and order the data 13c in the second data field 16 of the purchased-with data structure, all the records in the assemblage of purchase order history data are again examined this time examining product groupings that correspond to a purchase order number. As illustrated in FIG. 7, the process may start with the first record in the purchase order history data assemblage and, using the purchase order number reflected by the data 11 in the record currently being examined, all the unique product reference numbers as reflected in the second data field 12 for a record having data 11 representative of that current purchase order number are collected. Then, for each product reference number in this collection, a corresponding record in the purchased-with data structure is located, i.e., a record having data 13b in the first data field 14 which corresponds to one of the product reference numbers in the collection. Once each record in the purchased-with data structure is located, the data 13c in the second data field 16 of each record is examined to determine whether each of the remaining product reference numbers in the collected data (i.e., each product in the collected data but the product referenced by the first data field 14 of that record) is reflected within the data 13c. If the data 13c reflects a product reference number from the product reference numbers in the collected data currently being considered, then the data representative of that product reference number may be exchanged with adjacent data, if any, within the second data field 16, e.g., the product reference number immediately to its left. If the product reference number currently being considered is not reflected by the data 13c present in the second data field 16, then data reflective of that product reference number may be added to the second data field 16, e.g., to the end of the purchased-with string in the purchased-with data structure. Each collection of product reference numbers is processed in this way.

This manner of processing the data is illustrated in FIGS. 4 and 5. In this illustrated example, it will be seen that, when purchase order "3298553" is processed, product "4RJ34"—which was purchased with product "3U552"—is exchanged in location with the adjacent product "6VR65" in the record having data 13b in data field 14 that is representative of product "3U552." Similarly, since product "3U552" has already been placed into data field 16 of the record having data representative of product "4RJ34"—signifying that an earlier purchase order included these two products—and since product "3U552" is already at the front of the list, the data indicative of product "3U552" is left unchanged in location. As further illustrated in FIG. 5, in some instances it may be desirable to insert a "null" product place holder in the location immediately behind product "3U552" in this case where the purchased-with product under consideration is already located in the predetermined location in the list, e.g., the front of the list. The use of a "null" product place holder, which may be blank characters when the data 13c is stored in a string, assists in maintaining purchased-with products that have a high tendency of being purchased with the product indicated by the data 13b in data field 14 in the vicinity of the predetermined location in cases when the purchased-with occurrences are not evenly distributed within the data set being consider. When place holder are utilized, they may be treated as product data during the process of exchanging locations within the second data field 16.

It is to be understood that ordering the data in the second data field 16 in such a manner may be performed concurrently with the populating of the second data field 16 or at a later time. It is to be further understood that the steps of ordering the data in the second data field 16 may be performed over multiple iterations to further ensure that products that are purchased concurrently with the product represented in the first data field 14 of a record are moved towards a predetermined location within the second data field 16. In this case, the number of iterations may be a number selected so as to generally assure that the ordering attains some degree of stability each time the process is repeated or the ordering itself can be examined after each pass to determine if the ordering has attained a desired level of stability after which time the repetitions of the process may be halted.

From the foregoing, it will be understood that, after all the purchase order product collections are processed in this manner, the purchased-with data structure will have 'n' records that correspond to 'n' unique items that are contained in the aggregation of purchase order data and each purchased-with field 16 in the purchased-with data structure will contain a list of unique products reference numbers that were purchased with the product reference number in the first field 14 of that record. If a product referenced in the first field 14 of the purchased-with data structure was not purchased with another product, the second data field 16 for the record for that product will be empty. It will also be understood that the method for ordering the data in the second data field 16 functions to move the products that are generally the most frequently purchased with each product referenced by the data in the first field 14 towards a predetermined location within the second data field 16, e.g., towards the front of the purchased-with string. This general ordering of the data in the second data field 16 will be sufficient to allow a B2B (or B2C) vendor to merchandise numerous products a customer may be interested in purchasing without requiring the vendor to consider the exact ranking or frequency of each of the purchased-with events. It will also allow marketing of products without requiring customer product rankings.

In particular, for identifying those products that may be of interest to a customer, the system and method considers the location of the product data within the second data field 16. For example, when a customer identifies a product as being of interest, the first data field 14 of the purchased-with data structure may be examined to find the record corresponding to that product. The second data field 16 of that record can then be examined to extract the data in the second data field 16 that is located within the predetermined location within the second data field 16. The products recommended would preferably be the products represented by the data in the predetermined location, i.e., this data would be representative of the products likely to be most often purchased with the identified product. While not intended to be limiting, the predetermined location may be the front of the purchased-with data string or the first X data entries in the front of the purchased-with data string.

The recommended products can be displayed to the customer in writing or images or be verbally expressed to the customer. Product recommendations may also include other data associated with the products recommended such as descriptions, prices, images, etc. It is to be understood that product identification used in the recommendation process may be by the customer searching for products using a website search engine, by being placed into a shopping cart, by being mentioned by customers in a conversation over the phone or in person, etc. Still further, the purchased-with data structure may be examined to discern products that are likely to be purchased together for the purpose of associating those products within a catalog or other sales literature, for providing directed marketing mailings, etc. The purchased-with data structure utilized in the recommendation process may be made accessible by being located on one or more servers within a network, may be distributed by being placed onto a CD or DVD ROM, may be downloadable, etc. In this manner, the purchased-with data structure may be accessible by being directly readable by a hand-held device (such as a PDA) or, for example, by providing the hand-held device with network access, preferably wireless, whereby the PDA may access the network server(s) on which the purchased-with data structure is stored.

It is additionally contemplated that system and method described herein may also function to direct the consumer to other purchasing opportunities, e.g., to direct the consumer to products sold under other brand names, appearing on other catalog pages, of other product categories, etc. Generally, the additional purchasing opportunities that are presented to the consumer are those that have been determined to be relevant to a product attribute that is identified as being of interest to a consumer. In this regard, product attributes may include, but need not be limited to, product SKUs, product categories, catalog pages, vocations with which products are utilized (e.g., plumber, facilities management, etc.), geographic locations in which products are utilized or typically sold (zip code, state, country, regions, etc.), or any other attribute that may be used to define a product or which may be used to search for a product within an electronic database. As such, to facilitate this form of purchasing opportunity recommendation, the various products preferably have a corresponding record in an electronic database, i.e., electronic catalog, where the product records would each include fields in which are maintained the various attributes or parameters that are used to define the product, e.g., a stock number ("SKU") for a product, brand name for a product, category for a product (e.g., noun descriptors), catalog page on which the product appears, etc. An example of such an electronic catalog is illustrated and described in commonly assigned, U.S. published application 2003/0105680 which U.S. published application for patent is incorporated herein by reference in its entirety.

Figure 8:
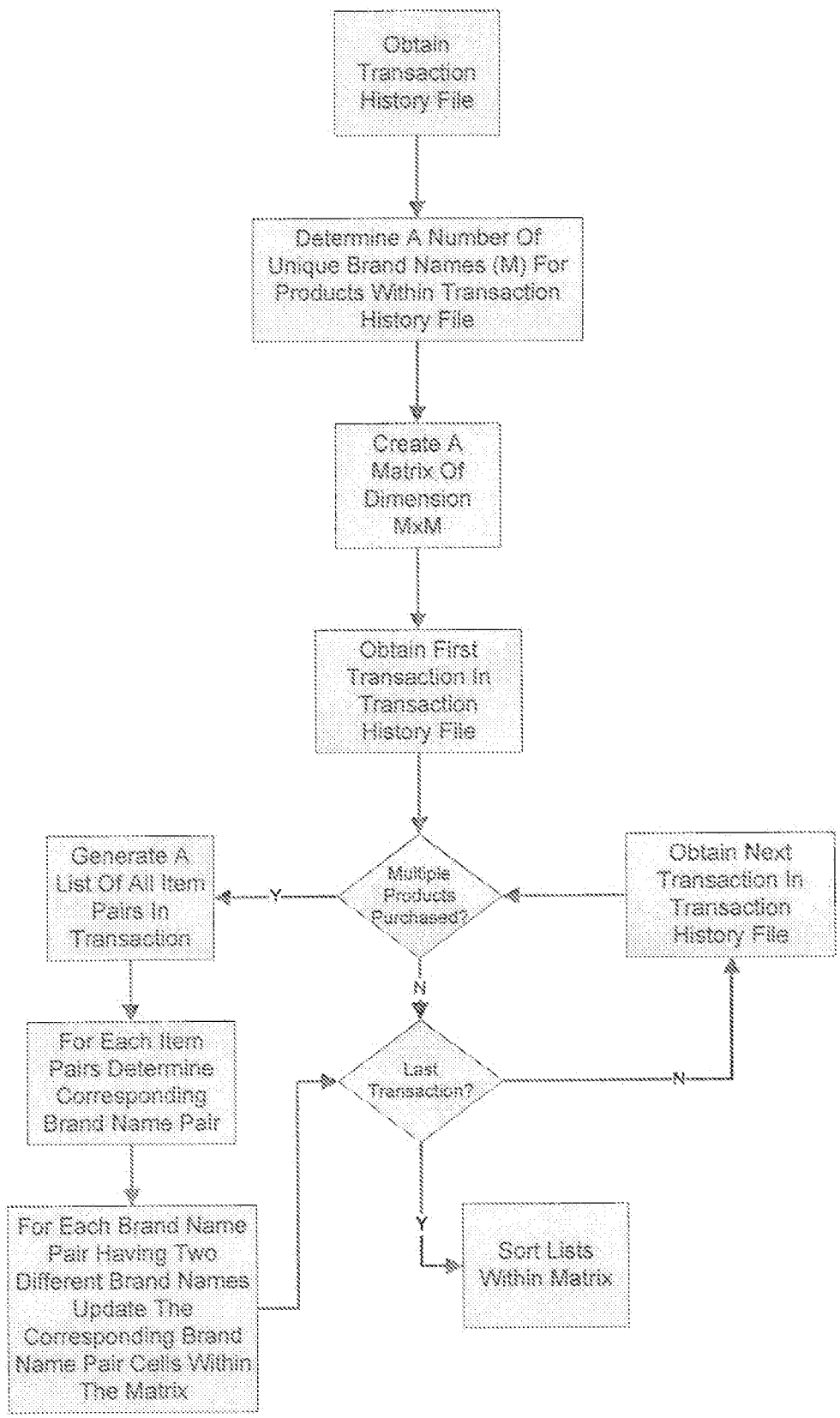
FIG. 8 illustrates a flow chart diagram of an exemplary method for creating lists of purchased-with brand names.
Figure 9:
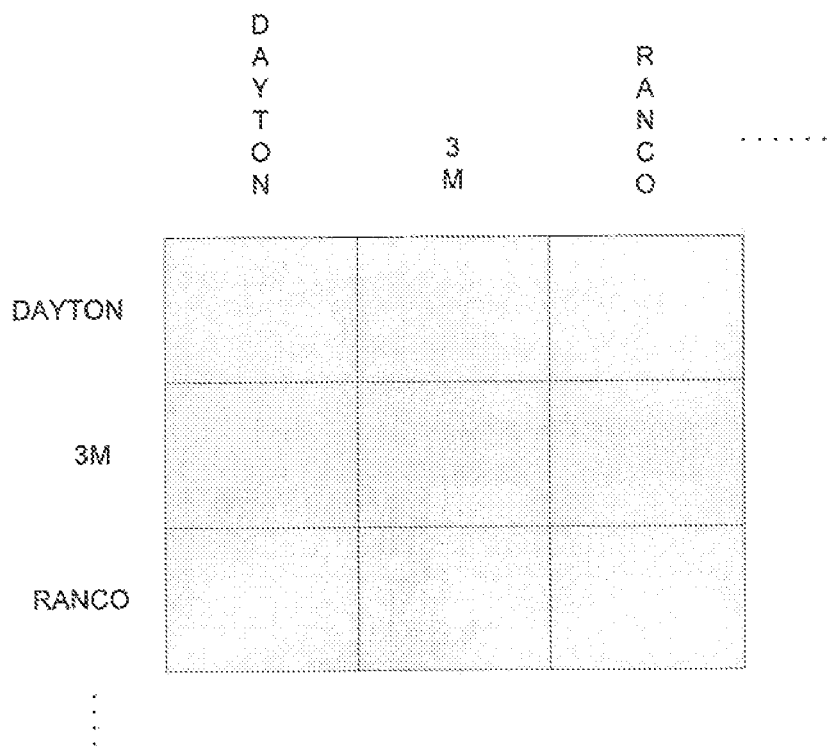
FIG. 9 illustrates an exemplary purchased-with brand name matrix for use in connection with the method of FIG. 8.

In a first illustrated example, for presenting to a consumer purchasing opportunities which would lead a consumer to products sold under brand names determined to be relevant to, for example, a brand name of a product of interest to a consumer, a brand name affinity look-up matrix is preferably used which generally reflects how often products of two different brand names are purchased together. To create the brand name affinity look-up matrix, i.e., purchased-with brand name lists, purchase histories, i.e., purchase orders, of consumers are obtain and examined as illustrated in FIG. 8. More particularly, the purchase histories are examined to determine a number of unique brand names that are found within the purchase histories. In the case where the purchase histories merely disclose the SKUs of products purchased, the SKUs may be cross referenced against the electronic catalog to discern the brand names for the products purchased, e.g., it can be discerned from the records within the electronic catalog that SKU 5X808 appearing on a purchase order corresponds to a "3M" brand name yellow, hard, plastic hat. Once the number of unique brand names (M) within the purchase histories is determined, a matrix (M×M) may be created having rows and columns associated with each of the unique brand names. An example matrix is illustrated in FIG. 9.

Figure 10:
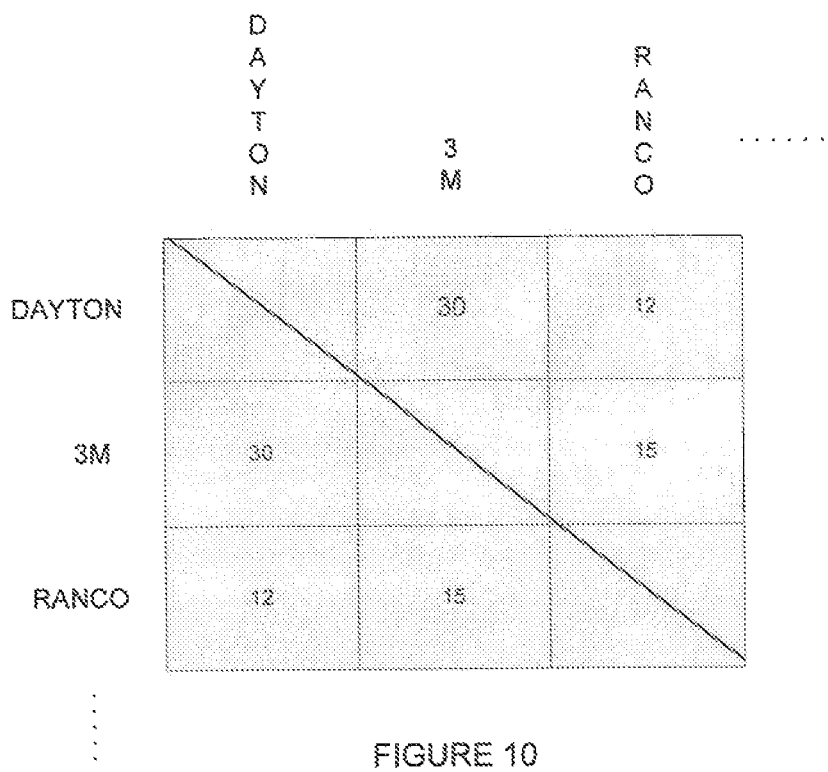
FIG. 10 illustrates the exemplary purchased-with brand name matrix of FIG. 9 populated with occurrence data.

Once the Matrix is created, each of the transactions within the purchase histories may then be examined to determine if the transaction includes two or more products that were purchased together. When a transaction includes two or more products that were purchased together, e.g., a 1A123 "Ranco" brand name barricade, a 3K015 "Dayton" brand name motor, and a 5X808 "3M" brand name hard hat, a list of product pairs within the transaction may be generated. Specifically, if there are n products that were purchased together within a transaction, there will be C(n,2) possible product pairs, e.g., 1A123 with 3K015, 1A123 with 5X808, and 3K015 with 5X808. For each product pair discerned, the system may determine the corresponding brand name pairs, e.g., "Ranco" with "Dayton," "Ranco" with "3M," and "Dayton" with "3M". In this regard, the system and method is particularly interested in pairings that include products of differing brand names and, as such, pairing of the same brand name may be simply ignored during the method steps which follow. Using the brand name pairings identified, the system functions to update the brand name look-up matrix by incrementing a count maintained within each cell that corresponds to an identified brand name pairing, e.g., the count within each of the "Ranco"/"Dayton," "Dayton"/"Ranco," "Ranco"/"3M," "3M"/"Ranco," "Dayton"/"3M," and "3M"/"Dayton" cells would be incremented by one. An example of a look-up matrix after these steps have been performed is illustrated in FIG. 10.

The data within the look-up matrix list may then be sorted to create ordered purchased-with brand name lists. For example, for each brand name listed in a first dimension (e.g., along the Y axis) the brand names in the second dimension (e.g., along the X axis) may be sorted using the count maintained within the cells (e.g., in an order of descending magnitude). Thus, in keeping with the illustrated example, the ordered purchased-with brand name listing for the brand name "Dayton" would be "3M" followed by "Ranco," the ordered purchased-with brand name listing for the brand name "3M" would be "Dayton" followed by "Ranco," and the ordered purchased-with brand name listing for "Ranco" would be "3M" followed by "Dayton."

Once the ordered purchased-with brand name list for the various brand names have been created, using the above-described or any other suitable methodology, the consumer may be presented with one or more brand names in response to the customer indicating a product brand name (or other product attribute) as being of interest, the brand names being presented as leads to additional purchasing opportunities. As noted previously, the interest of the consumer in a particular brand name may be indicated to the system by the consumer searching for a product by SKU, brand name, etc. (by clicking on a hyperlink, entering the information into a free form search engine, etc.), by placing a product within a shopping cart, etc. Using the brand name associated with product(s) specified as being of interest (which may include using the electronic catalog as a cross referencing source to discern a brand name associated with product(s) specified as discussed above), the system may access the sorted purchased-with brand name list(s) corresponding to the brand name(s) associated with the product(s) specified as being of interest and then select one or more of the purchased-with brand names from the corresponding sorted list(s) as a function of the location of the one or more purchased-with brand names within the list for presentation to the consumer. For example, the first N product brand names within the sorted purchased-with brand name list may be selected for presentation to the consumer. In keeping with the illustrated example, if only the first product brand name within the sorted purchased-with brand-name list is to be selected for presentation to the consumer as an additional purchasing opportunity, the following would occur: in response to the consumer selecting the brand name "Dayton" (or a "Dayton" product for example) as being of interest the consumer would be presented with a hyperlink to allow the consumer to access information for "3M" products; in response to the consumer selecting the brand name "3M" (or a "3M" product for example) as being of interest the consumer would be presented with a hyperlink whereby the consumer may access information for "Dayton" products; or in response to the user selecting the brand name "Ranco" (or a "Ranco" product for example) as being of interest the consumer would be presented with a hyperlink whereby the user may access information for "3M" products.

Figure 11:
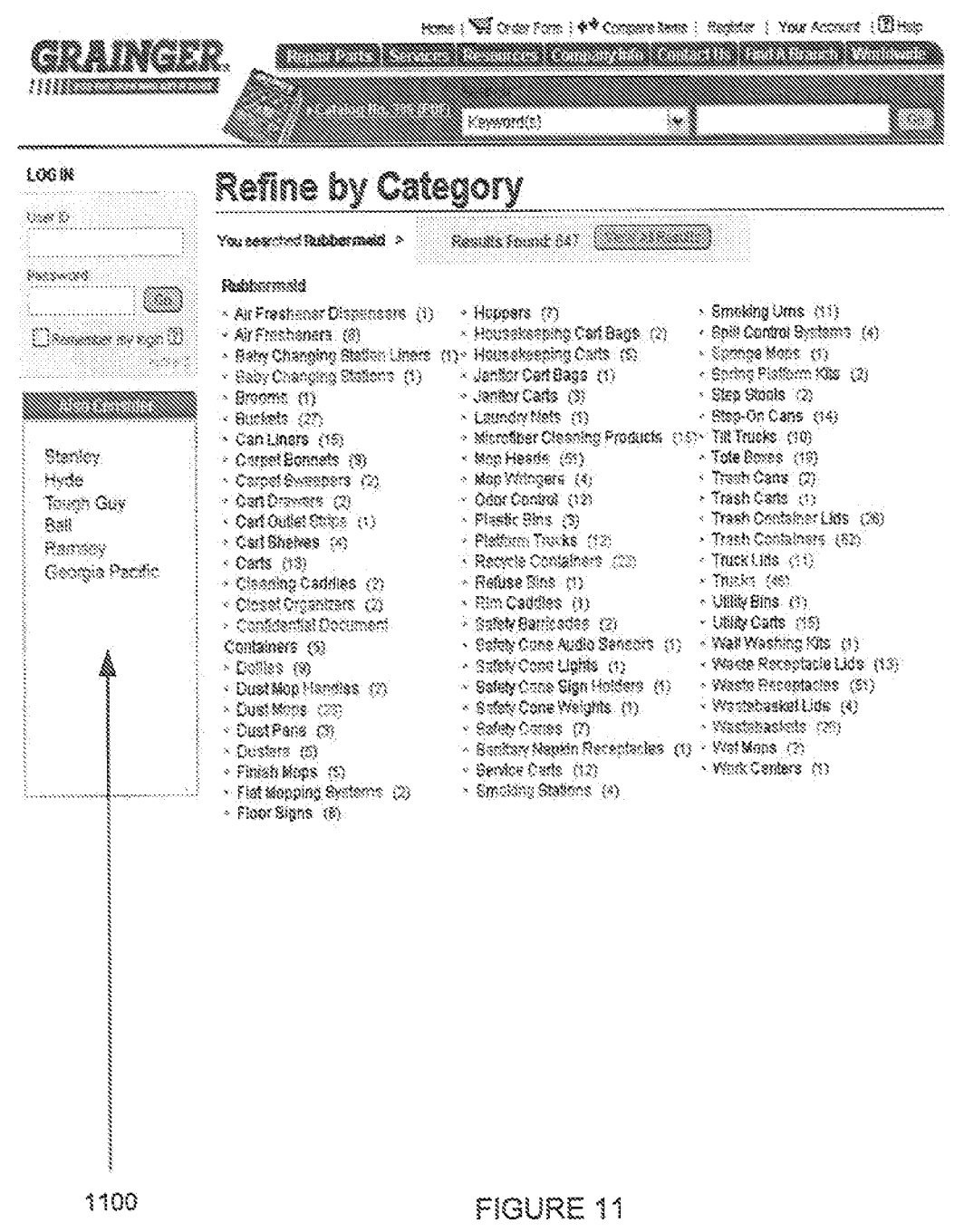

An example Web page showing hyperlinks for directing a user to additional products sold under other brand names 1100 determined to be relevant to "Rubbermaid," which in this example has been selected by a consumer as being of interest, is illustrated in FIG. 11. As will be understood, in the illustrated example six brand name hyperlinks are provided which brand names would have been selected from a sorted "Rubbermaid" brand name purchased-with list created in a manner discussed previously, i.e., the six brand names presented to the user are indicative of brand names of products that history shows are typically purchased with "Rubbermaid" brand name products. As will be further understood, when a consumer activates one of the brand name links, the consumer may be presented with further links to various products, or categories of products, sold under the selected brand name in a manner similar to which products/product categories for "Rubbermaid" brand name products are presented to the user in illustrative FIG. 11.

Figure 12:
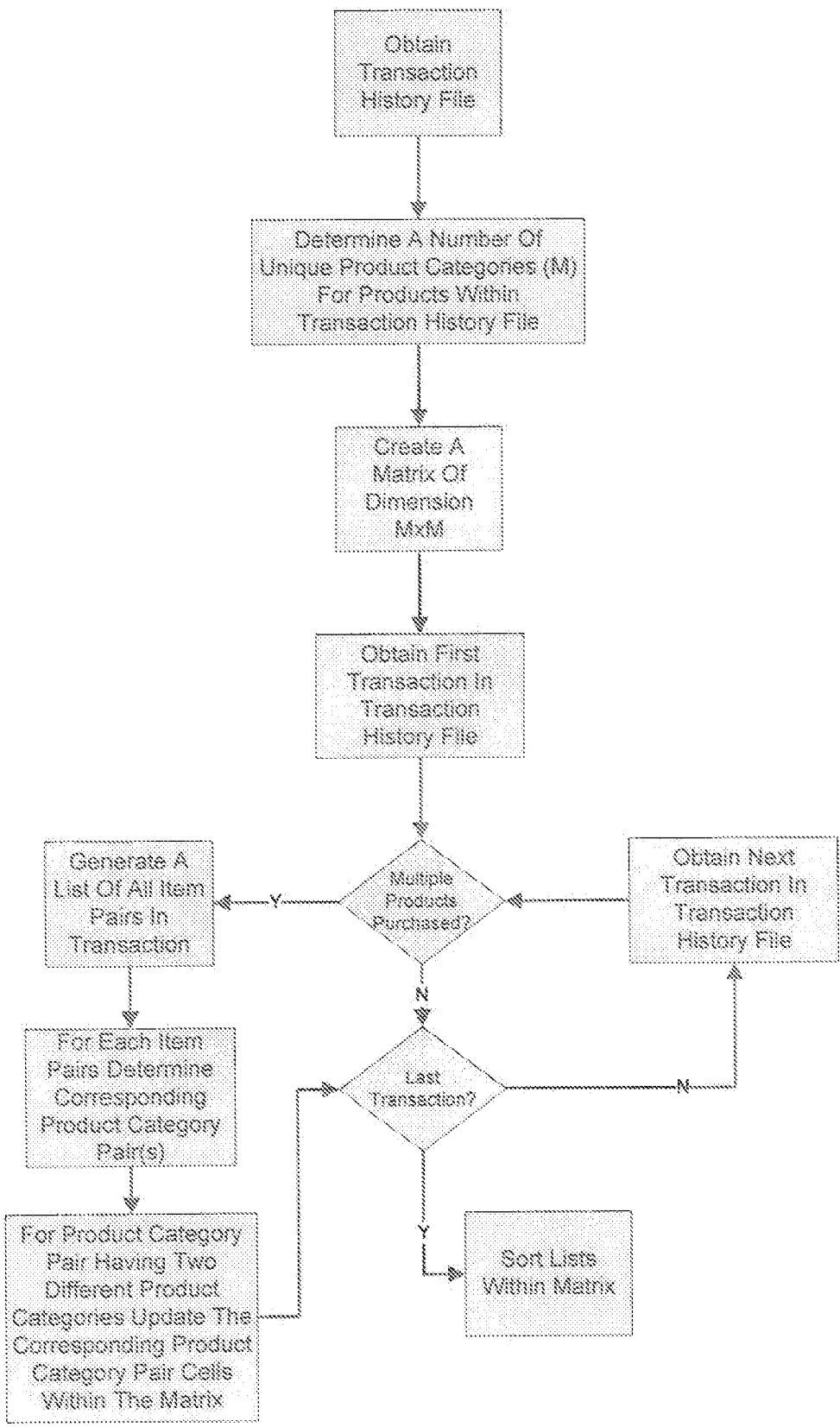
FIG. 12 illustrates a flow chart diagram of an exemplary method for creating lists of purchased-with product categories.
Figure 13:
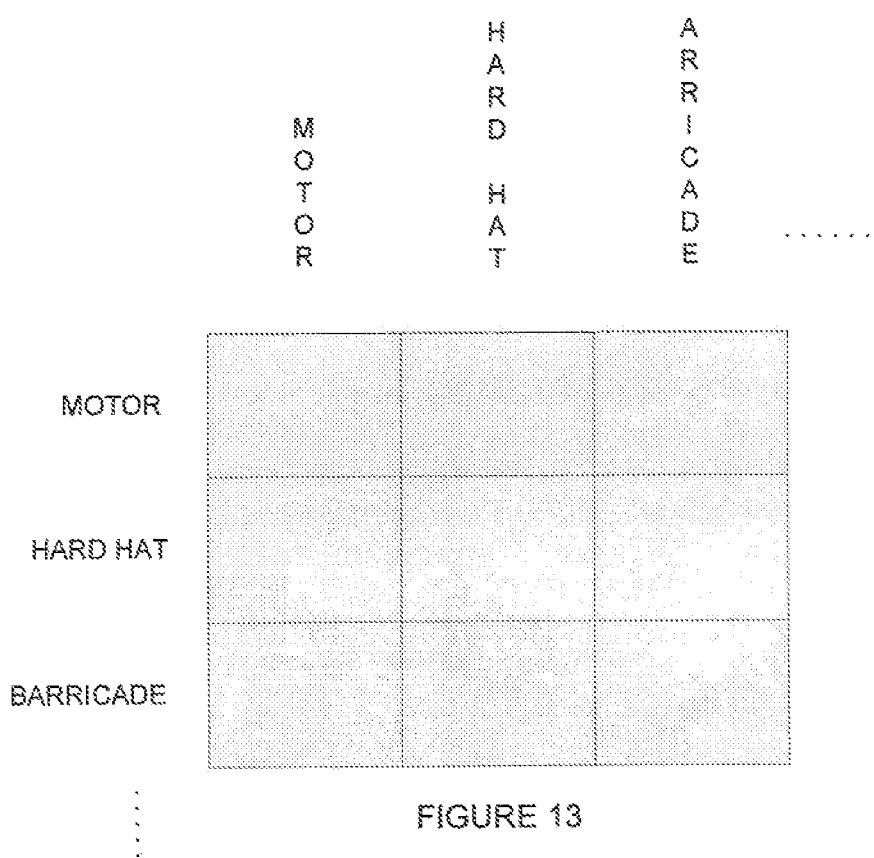
FIG. 13 illustrates an exemplary purchased-with product category matrix for use in connection with the method of FIG. 12.

In a manner similar to that described above, purchased-with lists may also be created using other product attributes maintained within the electronic catalog. By way of further example, purchased-with lists may be created using product attributes such as product categories, i.e., noun descriptors that are associated with products available for purchase. In keeping with this still further example, for presenting to a consumer the opportunity to purchase products sold within one or more product categories determined to be relevant to a product category of interest to a consumer, a category affinity look-up matrix is preferably used which generally reflects how often products of two different product categories are purchased together. To create the product category affinity look-up matrix, i.e., purchased-with product category lists, purchase histories, i.e., purchase orders, of consumers are obtain and examined as illustrated in FIG. 12. More particularly, the purchase histories are examined to determine a number of unique product categories, e.g., nouns associated with purchased products, that are found within the purchase histories. In the case where the purchase histories merely disclose the SKUs of products purchased, the SKUs may be cross referenced against the electronic catalog to discern the categories for the products purchased, e.g., it can be discerned from the records within the electronic catalog that SKU 5X808 appearing on a purchase order corresponds to a "3M" brand name yellow, hard, plastic, hat or a product in the "hard hat" category. Once the number of unique product categories (M) within the purchase histories is determined, a matrix (M×M) may be created having rows and columns associated with each of the unique categories. In some instances purchased products may have multiple nouns or categories associated therewith each of which may be considered separately when creating noun or category pairings in keeping with the methodology described below. An example matrix is illustrated in FIG. 13.

Figure 14:
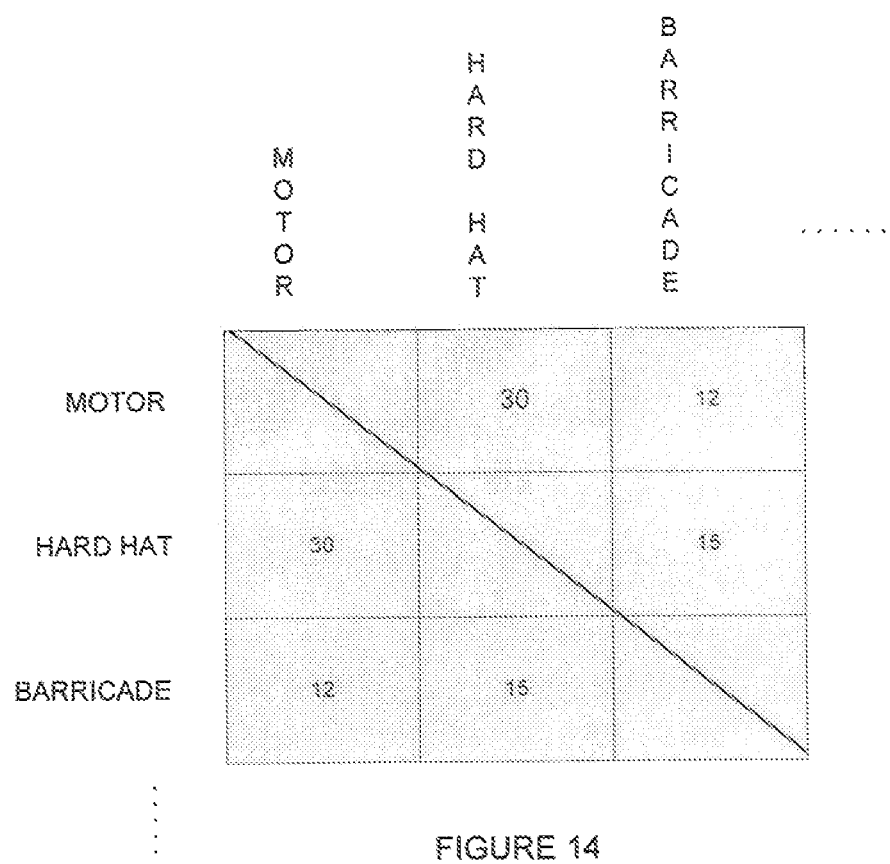
FIG. 14 illustrates the exemplary purchased-with product category matrix of FIG. 13 populated with occurrence data.

Once the Matrix is created, each of the transactions within the purchase histories may then be examined to determine if the transaction includes two or more products that were purchased together. When a transaction includes two or more products that were purchased together, e.g., a 1A123 "Ranco" brand name barricade, a 3K015 "Dayton" brand name motor, and a 5X808 "3M" brand name hard hat, a list of product pairings within the transaction may be generated. Specifically, if there are n products that were purchased together within a transaction, there will be C(n,2) possible product pairs, e.g., 1A123 with 3K015, 1A123 with 5X808, and 3K015 with 5X808. For each product pair discerned, the system determines the corresponding noun or category pairings (of which there may be more than one as noted above depending upon the descriptors selected as being of interest to the process), e.g., barricade with motor, barricade with hard hat, and motor with hard hat. In this regard, the system and method is particularly interested in pairings that include items of differing categories and, as such, product pairings of the same category may be simply ignored during the method steps which follow. Using the category pairings identified, the system functions to update the category look-up matrix by incrementing a count maintained within each cell that corresponds to an identified category pair, e.g., the count within each of the barricade/motor, motor/barricade, barricade/hard hat, hard hat/barricade, motor/hard hat, and hard hat/motor cells would be incremented by one. An example of a look-up matrix after these steps have been performed is illustrated in FIG. 14.

The data within the look-up matrix list may then be sorted to create purchased-with category lists. For example, for each product category listed in a first dimension (e.g., along the Y axis) the product categories in the second dimension (e.g., along the X axis) may be sorted using the count maintained within the cells (e.g., in an order of descending magnitude). Thus, in keeping with the illustrated example, the ordered purchased-with category listing for motor would be hard hat followed by barricade, the ordered purchased-with category listing for hard hat would be motor followed by barricade, and the ordered purchased-with category listing for barricade would be hard hat followed by motor.

Once the ordered purchased-with category list for the various product categories have been created, using the above-described or any other suitable methodology, the consumer may be presented one or more product categories in response to the customer indicating a product category (or other product attribute) as being of interest, the product categories being presented as leads to additional purchasing opportunities. Using the product category (or other product attribute) specified as being of interest (which may include using the electronic catalog as a cross referencing source to discern a product category associated with a product(s) so specified as discussed above), the system may access the sorted purchased-with product category list(s) corresponding to the consumer specified category or categories (or other product attributes) and then select for presentation to the consumer one or more of the purchased-with categories from the corresponding sorted purchased-with list(s) as a function of the location of the one or more purchased-with categories within the list. For example, the first N product categories within the sorted purchased-with product category list may be selected as recommendations to the consumer. In keeping with the illustrated example, if only the first product category within the sorted purchased-with product category list is to be used as a recommendation, the following would occur: in response to the consumer selecting the product category motor (or a motor product for example) as being of interest the consumer would be presented with a hyperlink whereby the consumer may access information for hard hat products; in response to the consumer selecting the product category hard hat (or a hard hat product for example) as being of interest a hyperlink would be presented to the consumer whereby the consumer may access information for motor products; or in response to the user selecting the product category barricade (or a barricade product for example) as being of interest a hyperlink would be presented to the consumer whereby the consumer may access information for hard hat products.

Figure 15:
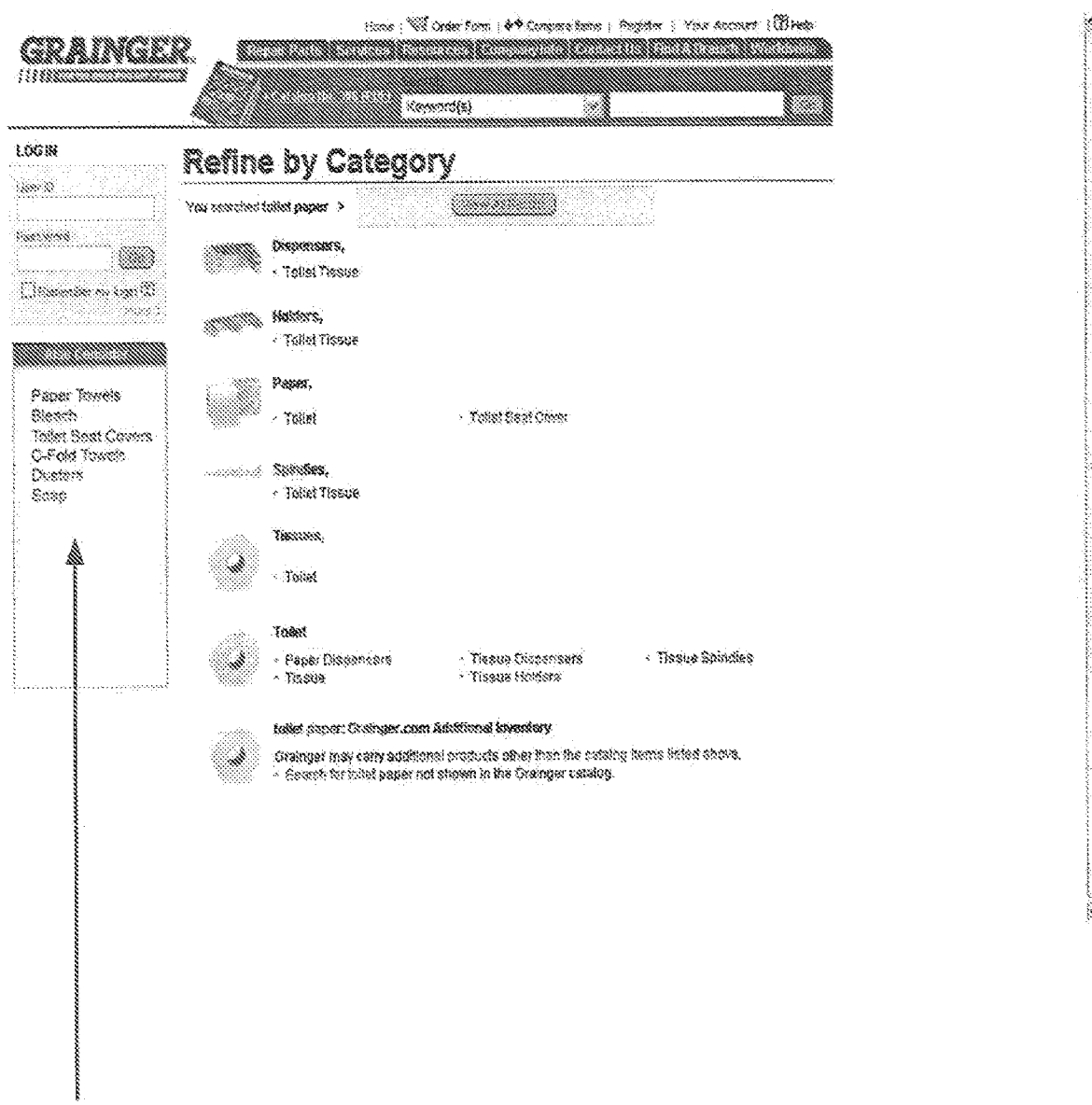
FIG. 15 illustrates an exemplary Web page including category links for directing a customer to additional purchasing opportunities applicable to a specified product category.

An example Web page showing hyperlinks for directing the consumer to products sold under product categories 1500 which hyperlinks, in this example, are presented to the consumer in response to the consumer selecting the product category "toilet paper" as being of interest is illustrated in FIG. 15. As will be understood, in the illustrated example six product category links are provided to the consumer which product categories would have been selected from a sorted "toilet paper" product category purchased-with list created in a manner discussed previously. As will be further understood, when a consumer activates one of the product category links, the consumer may be presented with further links to various products, or further categories of products, sold under the selected product category in a manner similar to which products/product categories for "toilet paper" products are presented to the user in illustrative FIG. 15.

Still further, the methodology described above may be utilized to direct a consumer to page(s) within a catalog (electronic or paper) on which purchased-with products appear. For example, if product 1A123 is found on catalog page 2729, product 3K015 is found on catalog page 20, and product 5X808 is found on catalog page 2517, the catalog page information may be used to create sorted purchased-with catalog page lists such that, in response to a consumer specifying product 1A123, in keeping with the above set forth examples (or a product of the "Ranco" brand name or a product within the barricade category), the consumer may be provided with a link to catalog page 2517 on which appears the 5X808 "3M" brand name hard hat (and possibly other products) which has been discerned to have been purchased-with the product feature specified by the consumer.

Figure 17:
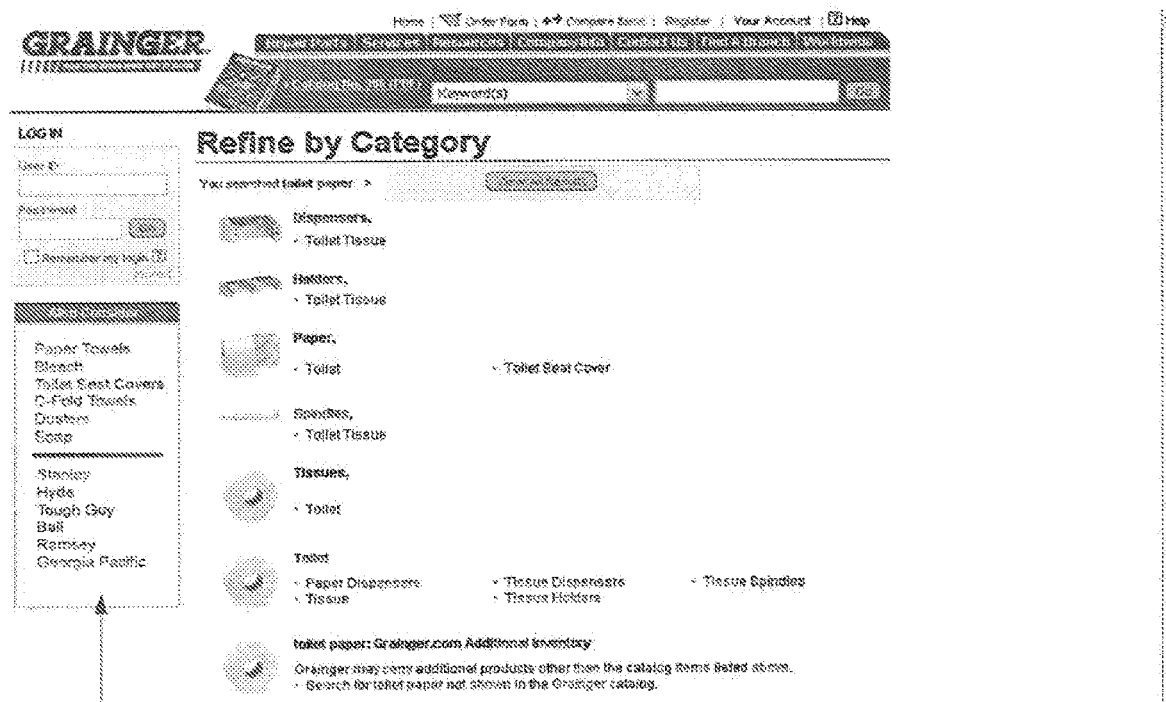
FIG. 17 illustrates an exemplary Web page including brand name links and category links for directing a customer to additional purchasing opportunities applicable to a specified product category.
Figure 18:
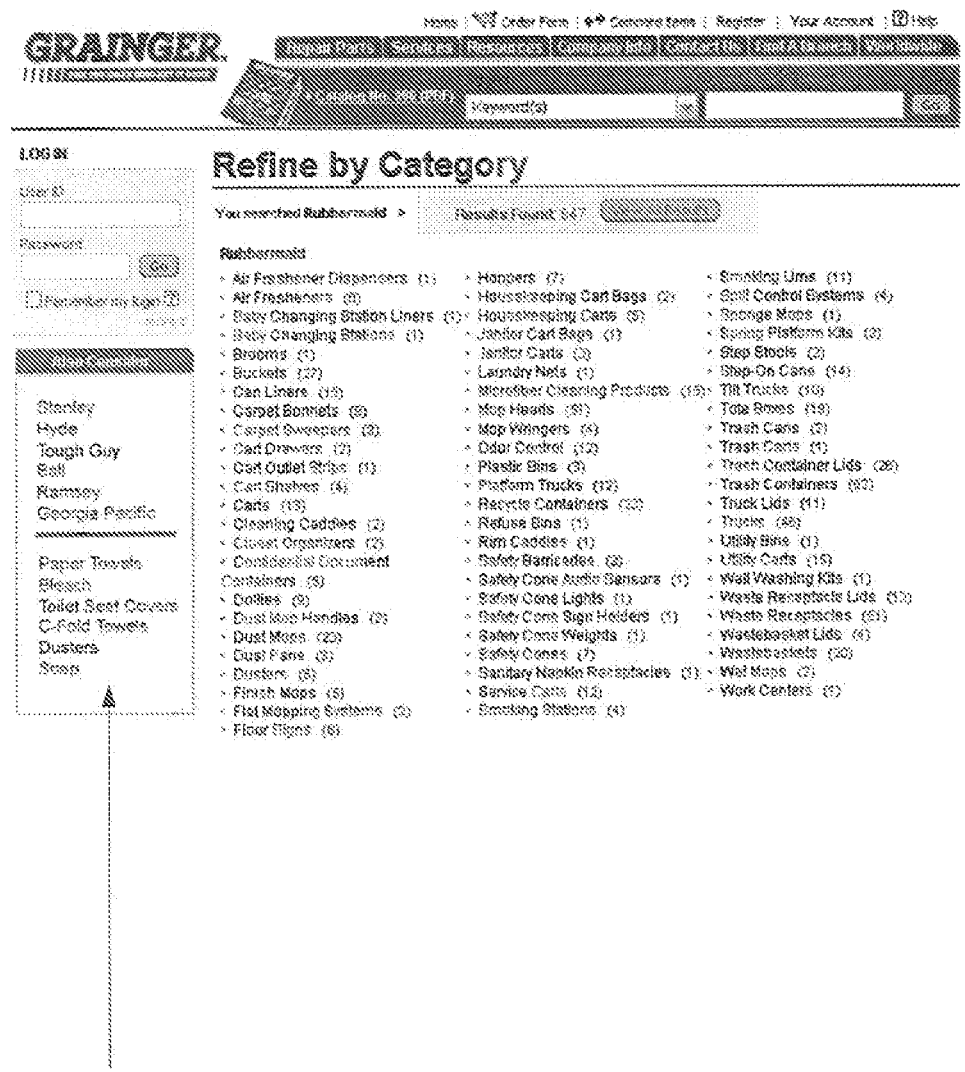
FIG. 18 illustrates an exemplary Web page including brand name links and category links for directing a customer to additional purchasing opportunities applicable to a specified brand name.

From the foregoing it will additionally be appreciated that the subject system and method will allow for the creation of multiple types of purchased-with lists that function to map various product attributes to various other product attributes of products that have been purchased in pairs. In this manner, the system and method will allow for directing consumers to products beyond the familiar item to item recommendations seen in the prior art. Thus, the described methodology may provide for the creation of purchased-with lists that define relationships between product attributes such as product categories, product brand names, catalog pages, vocations using products, geographies in which products are used, product SKUs, and/or any other product attribute deemed to be of interest. This is illustrated generally in FIG. 16 which shows examples of possible combinations of purchased-with attributes for which relationships may be discerned. In this manner, multiple, different types of purchasing opportunities may be provided to a consumer as illustrated in FIG. 17 (showing links 1700 to products sold under product brand names and in product categories that history shows were purchased-with the specified product category of "toilet paper") and FIG. 18 (showing links 1800 to products sold under brand names and in product categories that history shows were purchased-with the specified product brand name "Rubbermaid").

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A computer-readable media embodied in a non-transient, physical memory device having stored thereon computer-executable instructions for creating a graphical user interface, the instructions performing steps comprising:
   tracking a plurality of sessions corresponding to a plurality of consumers, individual ones of the plurality of sessions storing consumer interactions with a network site, wherein the consumer interactions comprise a record of virtual shopping cart purchasing activity associated with a plurality of products;
   discerning within the tracked plurality of sessions pairings of products from the plurality of products that were purchased together and that have at least one product attribute which differ;
   ranking products within the discerned pairings of products to create ordered lists which contain data indicative of degrees to which combinations of different product attributes appear within the discerned pairings of products;
   in response to data provided by a consumer indicative of a first product attribute, using the data to select from the created ordered lists one or more second product attributes wherein the one or more selected second product attributes are different from the first product attribute and wherein the one or more selected second product attributes occur in combination with the first product attribute within the discerned pairings of products;
   using the selected second product attributes to create the graphical user interface, wherein each of the one or more selected second product attributes are associated with a corresponding graphical user interface element whereby the consumer may interact with the graphical user interface element associated with the one or more selected second product attributes to access information relevant to products having the one or more selected second product attributes; and
   generating, in response to a request from a client device over network, a network page to display the created graphical user interface.

2. The computer-readable media as recited in claim 1, wherein the first and second product attributes comprise at least two different product attributes selected from a product attribute group comprised of: a product brand name, a product SKU, a catalog page, and a product category.

3. The computer-readable media as recited in claim 2, wherein the graphical user interface element comprises a hyperlink.

4. The computer-readable media as recited in claim 1, wherein the first and second product attributes are selected from fields within an electronic catalog.

* * * * *